United States Patent [19]

Häfner

[11] Patent Number: 4,864,874

[45] Date of Patent: Sep. 12, 1989

[54] FORCE MEASURING DEVICE

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 226,592

[22] Filed: Aug. 1, 1988

[30] Foreign Application Priority Data

Aug. 5, 1987 [DE] Fed. Rep. of Germany ....... 3725917
May 27, 1988 [DE] Fed. Rep. of Germany ....... 3818126

[51] Int. Cl.$^4$ .......................... G01L 1/00; G01L 5/13
[52] U.S. Cl. ................................ 73/862.38; 73/862.57
[58] Field of Search ........... 73/862.38, 862.57, 862.58, 73/862.62, 862.68

[56] References Cited

U.S. PATENT DOCUMENTS

| | | | |
|---|---|---|---|
| 1,994,388 | 3/1935 | Erichsen | 73/862.62 |
| 2,108,746 | 2/1938 | Erichsen | 73/862.62 X |
| 3,410,135 | 11/1968 | Reynaud | 73/862.38 |
| 4,739,666 | 4/1988 | Hafner et al. | 73/862.68 |
| 4,770,050 | 9/1988 | Hafner | 73/862.68 |

FOREIGN PATENT DOCUMENTS 3502275  7/1986  Fed. Rep. of Germany ... 73/862.58

Primary Examiner—Charles A. Ruehl
Attorney, Agent, or Firm—Armstrong, Nikaido Marmelstein Kubovcik & Murray

[57] ABSTRACT

A novel force measuring device of simple design is provided with complementary stop surfaces protecting the device against over-loading. Alternatively, over-loading is prevented by duplicating the force measuring device with two portions operating in opposite directions of force application. Such force measuring devices are advantageously incorporated in couplings between a motor driven vehicle and a further vehicle to be coupled thereto. Signals derived from these force measuring devices are used in a board computer for controlling the operation of the motor driven vehicle and the further vehicle coupled thereto.

4 Claims, 2 Drawing Sheets

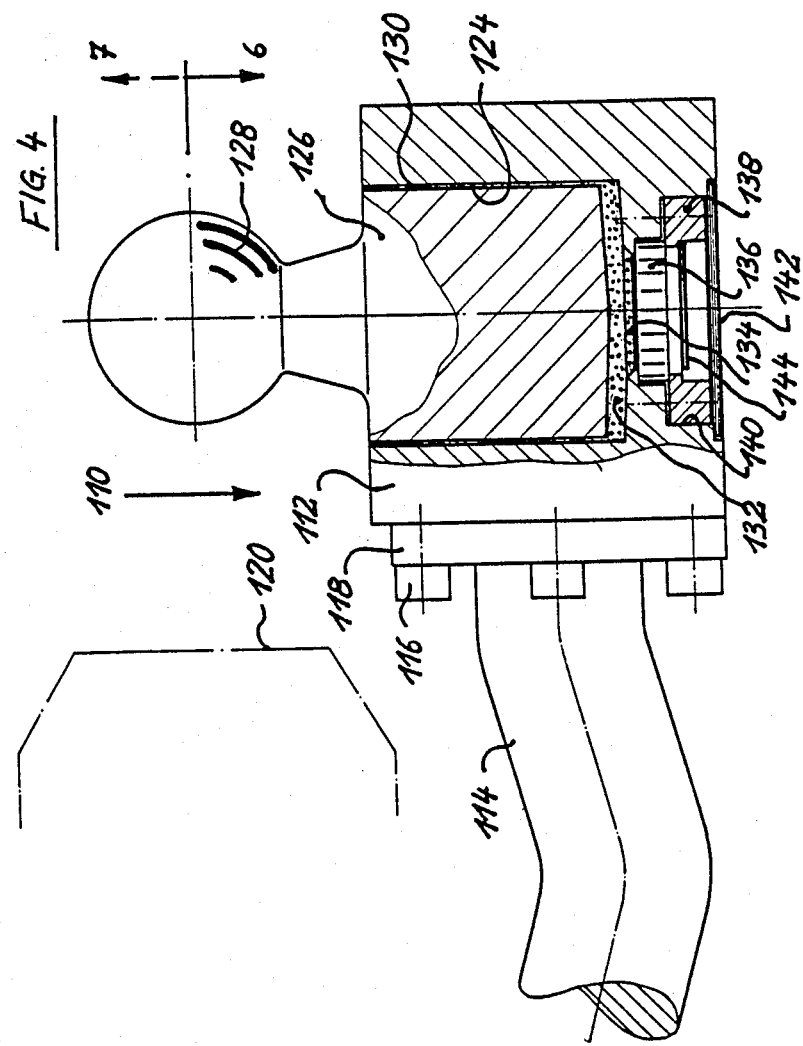

FORCE MEASURING DEVICE

FIELD OF THE INVENTION

The invention relates to a force measuring device using at least one pressure sensor and adapted for application of forces into opposite directions.

DESCRIPTION OF THE PRIOR ART

The German laid open patent publication No. 36 25 842 discloses force measuring devices using a pressure sensor operating on a piezo-electric basis or by using strain gauges embedded in an elastomeric material.

The German laid open patent publication No. 35 34 211 relates to a vehicle and a method for operating such a vehicle. Force measuring devices are used for optimizing the driving characteristics of the vehicle by determining forces exerted to the wheels, wheel suspensions, etc.. In general, the force measuring devices are loaded in one direction only, i.e. by the force exerted to a wheel. Under extreme conditions as with cars used in rallyes forces may be exerted onto the vehicle in the opposite direction, for example, when a wheel is freely elevated above ground or when driving the car over a very uneven ground.

In general, when using force measuring devices as defined above, only forces acting in one direction may be determined. Furthermore, there is a danger that the force measuring device is torn to pieces when pulling forces are applied theronto.

Beside determining forces acting in vertical direction there are applications where forces in horizontal direction are to be determined. For example, it would be desirable to determine tensional forces exerted by a trailer coupled to a motor car. When going down a slope the direction of the force will be reversed and the trailer may push the motor car.

SUMMARY OF THE INVENTION

It is an object of the present invention to provide a force measuring device protected against destruction by overloading.

It is a further object of the present invention to provide a force measuring device for determining forces acting in two opposite directions.

It is a still further object of the instant invention to provide a trailer coupling including means permitting a control of a driven vehicle having coupled thereto a further vehicle.

It is a further object of the instant invention to provide a motor driven vehicle having coupled thereto another vehicle by means of a coupling and being provided with an improved control of the operation of the vehicles.

According to a first aspect of the invention there is provided a force measuring device comprising: a housing means having a cylindrical recess; a piston inserted into said recess and having a peripheral surface forming a cylindrical narrow gap with a cylindrical surface of said recess; elastomeric material filling said gap and fixedly adhering to the peripheral surfaces of said piston and said cylindrical recess; a pressure sensor means arranged in contact with said elastomeric material and measuring forces applied to said piston and transmitted by said elastomeric material to said pressure sensor means; and a limiting means for limiting movement of said piston relative to said housing in direction of a longitudinal axis of said piston.

According to a second aspect of the invention there is provided a trailer coupling for vehicles having a force measuring device incorporated therein and a vehicle using such a trailer coupling.

According to a further aspect of the invention there is provided a method for controlling the operation of a motor driven vehicle provided with a coupling means for coupling a further vehicle thereto, comprising the steps: Incorporating a force measuring means into said coupling means; providing a board computer means in said motor driven vehicle; connecting said force measuring means to said board computer means; controlling the operation of said motor driven vehicle by said board computer means in response of signals received by said board computer means from said force measuring means.

BRIEF DESCRIPTION OF THE DRAWINGS

FIG. 4 is a sectional view of a trailer coupling provided with a force measuring device for determining vertical forces exerted on to the trailer coupling.

DESCRIPTION OF PREFERRED EMBODIMENTS

Figure 1:
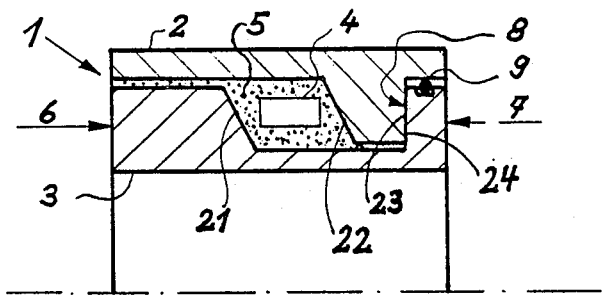
FIG. 1 is a sectional view of a first embodiment of a force measuring device according to the invention.

FIG. 1 shows a first embodiment of a force measuring device 1 including a cylindrical housing 2 having arranged in its interior a force introduction piston 3, preferably of cube-like shape. Elastomeric material 5, preferably silicon rubber fills a circular gap formed between complimentary tapered annular surfaces 21 and 22 formed at the exterior peripheral surfaces of the piston 3 and the interior peripheral surfaces of the housing 2, respectively.

The force measuring device 1 as explained above may be loaded in the main force direction 6 and will output a signal corresponding to the force applied thereto. Upon force application in the direction 6 the force introduction piston 3 tends to be shifted slightly to the right (FIG. 1). The force measuring device 1 shown in FIG. 1 may be used for a rather high forces or corresponding pressures up to several hundred bars in the main force direction 6. It should be noted, that a circular sealing 9 may be provided between the cylindrical housing 2 and the force introduction piston 3 for preventing any penetration of humidity or aggressive substances which may deteriorate the elastomeric material 5.

It should be understood, that the movement of the piston 3 is relative to the cylindrical housing 2. If a force is applied to the piston 3 in the opposite direction 7 the piston 3 would be drawn out of the housing 2. Therefore, a stop means 8 is provided limiting such a movement of the piston 3 relative to the housing 2. Specifically, opposing circular flanges 23, 24 extending radially may be formed complementary to each other on the exterior peripheral surfaces of the piston 3 and the interior peripheral surfaces of the housing 2, respectively. Thus, any force exerted onto the piston 3 in the direction 7 will move the piston 3 in FIG. 1 to the left until engagement of the annular surfaces 23, 24.

Figure 2:
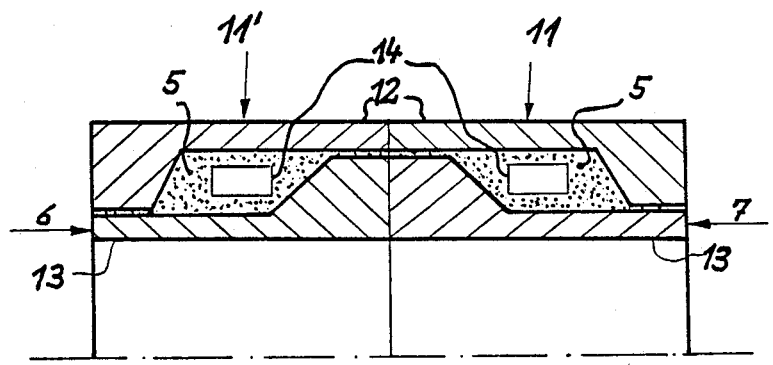
FIG. 2 is a sectional view of a second embodiment of the force measuring device according to the invention.

FIG. 2 shows a second embodiment of a force measuring device according to the invention using as a stop means for limiting the movement of a piston 13 in a housing 12 a second force measuring device 11' in addition to a force measuring device 11. The force measuring devices 11 and 11' have a similar, preferably an identical design and are combined with each other in an opposing manner.

Accordingly, considerable forces may be applied to the piston 13 both in the main force direction 6 or the opposite direction 7. Since the elastomeric material 5 is essentially incompressible there will be only a very slight relative movement between the housing 12 and the piston 13.

With a force measuring device according to the embodiment of FIG. 2 forces in two opposite directions may be determined.

Furthermore, using preloaded pressure sensor 14 permits a compensation of any differences in the characteristics of the pressure sensors in particular in a measuring region close to zero.

Figure 3:
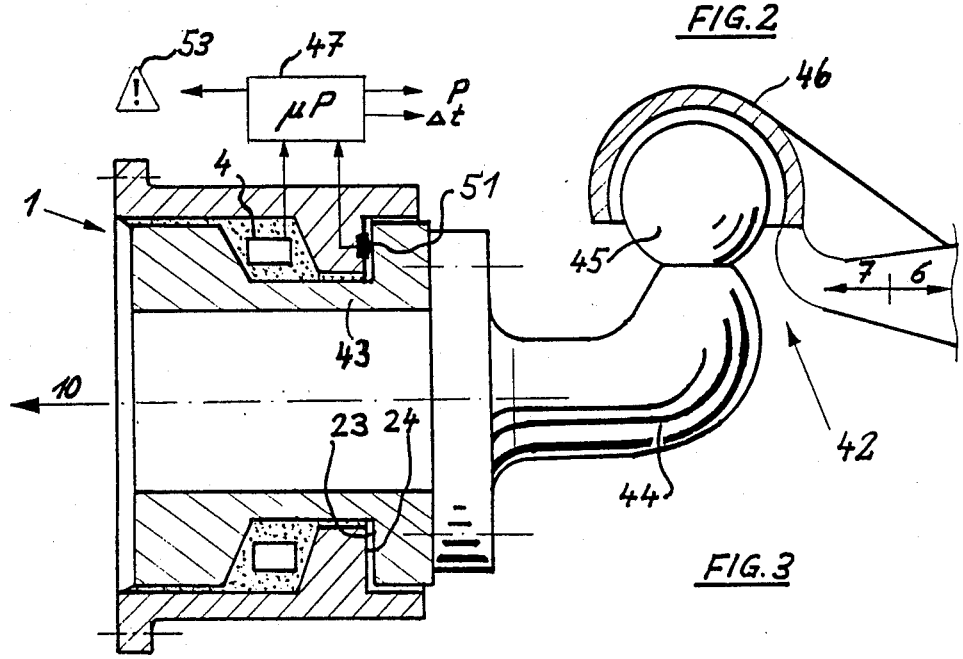
FIG. 3 is a schematic sectional view of a trailer coupling using a force measuring device according to FIG. 1.

FIG. 3 shows an application of a force measuring device according to FIG. 1 for a trailer coupling 42 shown as a ball head coupling and used for coupling a trailer to a motor car. A piston 43 has attached thereto, f.i. by screws a coupling part 44 provided with the coupling ball 45. An engaging part 46 of a trailer (not shown) engages in a well known manner the ball 45.

In operation any force acting on the coupling 42 will be transmitted to the pressure sensor 4 generating an output signal in dependence on the force applied. The output signal of the pressure sensor 4 is transmitted to a microprocessor 47 of the automatic control system of the vehicle for evaluation therein and for controlling the motor, the gearing, the steering and/or the brakes of the vehicle and/or the brakes of the trailer. Under normal conditions pulling forces will be measured by the pressure sensor 4 and transmitted to the microprocessor 47. However, when braking the vehicle the trailer may exert a pushing force on the coupling 42 urging the force introduction piston 43 in FIG. 3 to the left, which may result in an engagement of the surfaces 23, 24. For indicating this situation a contact 51, f.i. piezo crystal contact, may be provided on the surfaces 24 or 23 connected to the microprocessor 47. Upon engagement of the surfaces 23, 24 the contact 51 of an electrical circuit (not shown) will be closed transmitting a signal to the microprocessor 47, indicating a loading of the coupling in the pushing direction 7. Now, the microprocessor 47 may issue an acoustic or visual alarm signal indicated by reference numeral 53 in FIG. 3 and/or may increase the braking of the trailer.

Alternatively, a design of a force measuring device according to FIG. 2 may be used for more accurate control by determining both the pushing and the pulling forces acting on the coupling 42 and using these force for the control of the operation of the vehicle.

As a further alternative the pressure sensor 4 may be preloaded in order to enable it to measure forces in opposite directions.

As indicated in FIG. 3, the microprocessor 47 may generate signals for controlling the breaking pressure p and/or a timing signal indicating the coincidence or precession of the begin of breaking of the trailer in respect of the vehicle. Preferably, the microprocessor 47 has stored therein corresponding reference values which become effective in dependence on the loading of the vehicle and the momentary operational parameters of the vehicle and the characteristics of the road, as an upward or downward slope thereof.

It should be noted, that when using the design according to FIG. 2 for a coupling according to FIG. 3 the operation of the vehicle in combination with the trailer may be controlled more accurately. Specifically, the breaks of the trailer may be operated more strongly as compared with those of the vehicle in order to maintain the combination under pulling condition. In particular, the control of the braking may be such that a settable fixed force is maintained on the coupling independent from the condition of the road or intensity of braking.

As a modification of the embodiment according to FIG. 3 the operation of the force measuring device 1 may be reversed such that the stop means 8 (FIG. 1) would be affected under normal pulling condition whilst the pressure sensor 4 would measure any pushing forces acting on the coupling 42, when going down an inclined road or a upon braking of the vehicle.

Whilst with the embodiment of FIG. 3 the force measuring device according to the invention is used in connection with a trailer coupled to a vehicle, many other application will be apparent to a skilled person in connection with vehicles or any other apparatuses. For example, the force measuring device according to the invention may be integrated to other vehicle parts, as the spring legs, wheel suspensions, the steering system or the motor drive (for determining the torque acting theron).

An example for an application to other apparatuses than vehicles is the measurement of the advancing force to be applied to tools of milling or tooling machines or for measuring the compression forces for pressing machines.

FIG. 4 shows another embodiment of a trailer coupling 110 again provided with an integrated force measuring device. In this case vertical forces are measured, in particular the load exerted by a one axle trailer (not shown) to the coupling.

Whilst as a force measuring device a design according to FIG. 1 or FIG. 2 could be used the trailer coupling 110 uses a force measuring device as described in more detail in the above mentioned German laid open patent publication.

Specifically, the trailer coupling 110 includes as a housing a cubical metal body 112 connected to a vehicle 120 by means of a bar 114 secured to the metal body 112 by a flange 118 screwed thereto by screws 116.

A cylindrical recess 124 is provided in the metal body 112 extending through a large part of its height, for example ¾ thereof. The diameator of the recess 124 is in the order of its height.

A piston 126 is inserted into the recess 124 and a ball 128 being formed at its top side for a well known coupling by means of a spheric coupling element, as the coupling element 46 shown in FIG. 3 to a one axle trailer.

The piston 126 has such a diameter, that a cylindrical gap 130 is formed between the peripheral surface of the piston 126 and the peripheral interior surface of the recess 124. Between the interior end surfaces of the piston 126 and the interior bottom of the recess 124 a small space is formed completely filled with elastomeric material, as silicon rubber, as is the gap 130.

The piston 112 is provided with a passage 140 at its bottom side having inserted therein a force measuring device in particular a pressure sensor 136 secured in the passage 140 by means of a threaded ring 138. The topside of the pressure sensor 136 is in contact with the elastomeric material in the space 132 via an opening 134.

In the interior of the ring 138 a circuit board 144 is provided for holding electronic circuits of the pressure sensor 136, the ring 138 on its inner opening being closed, preferably air- and humidity tight by means of a plate 142.

It should be noted, that this type of a force measuring device and its manufacture has been disclosed in detail in the above mentioned German laid open patent publication. Such a force measuring device, in particular with dimensions as indicated above, are extremly insensitive against lateral forces, whilst vertical forces may be measured accurately.

The elastomatic material fixedly adheres to the contact surfaces of the piston 126 and the recess 124 resulting in a very stable design.

Upon coupling of the trailer to the ball 128 the vertical force exerted onto the piston 126 is transmitted through the elastomeric material to the pressure sensor 136. The signal generated by the pressure sensor 136 may be used for any desired purpose. For example, with a vehicle provided with a board computer as the microprocessor 47 according to FIG. 3 the vertical force measured by the pressure sensor 136 may be compared with a reference value an visual or acoustic alarm being initiated upon exceeding of a predetermined maximum load. Even starting the vehicle may be blocked.

In operation, the board computer may be supplied with a signal corresponding to the actual load for indication thereof and/or for use in optimizing the operation characteristics of the vehicle. Furthermore, the pressure sensor output signal may be generated continuously and may be considered by the board computer when accelerating or braking or steering thereof. It is of particular importance to control the brakes of the trailer in response to the load exerted to the coupling.

It should be noted, that the embodiment according FIG. 4 may be easily combined with the embodiment according to FIG. 3, or may be furnished with the stop or limiting means 8 or 11' of FIG. 1 or 2, especially if there is the danger or possibility, that vertical forces in the opposite direction 7 may occure, f.e. when the trailer is overloaded in its back region, so that especially on an uneven road the coupling ball 45 may be drawn in the upright direction 7.

Whilst preferably the specific types of force measuring devices according to FIG. 1 and FIG. 2 may be used for the trailer coupling according to FIG. 3 and/or 4 other force measuring devices as strain gauges may be used as well.

I claim:

1. A force measuring device comprising:
   a housing means having a cylindrical recess;
   a piston inserted into said recess and having a peripheral surface forming a cylindrical narrow gap with a cylindrical surface of said recess;
   elastomeric material filling said gap and fixedly adhering to the peripheral surfaces of said piston and said cylindrical recess;
   a pressure sensor means arranged in contact with said elastomeric material and measuring forces applied to said piston and transmitted by said elastomeric material to said pressure sensor means; and
   a limiting means for limiting movement of said piston relative to said housing in direction of a longitudinal axis of said piston.

2. The force measuring device of claim 1, wherein said limiting means is formed by complementary opposing radial projections formed at said peripheral surfaces of said piston and said cylindrical recess.

3. The force measuring device of claim 1, wherein said limiting means are provided with a signal generating means generating a signal indicative of an excessive force exerted onto said force measuring device.

4. The force measuring device of claim 1, wherein said limiting means is formed by duplicating said force measuring device including first and second pressure sensors measuring forces applied to said force measuring devices in opposite directions.

* * * * *